United States Patent
Lee et al.

(10) Patent No.: US 8,783,702 B2
(45) Date of Patent: Jul. 22, 2014

(54) SINGLE-AXIS DAMPING JOINT FOR CONNECTING CHASSIS COMPONENTS FOR VEHICLES

(75) Inventors: Young-Chun Lee, Suwon-si (KR); Tae-Sung Kwon, Gyeongju-si (KR)

(73) Assignee: Iljin.Co.Ltd., Gyeongsangbuk-do (KR)

( * ) Notice: Subject to any disclaimer, the term of this patent is extended or adjusted under 35 U.S.C. 154(b) by 0 days.

(21) Appl. No.: 13/702,553

(22) PCT Filed: Jul. 20, 2010

(86) PCT No.: PCT/KR2010/004730
§ 371 (c)(1),
(2), (4) Date: Dec. 6, 2012

(87) PCT Pub. No.: WO2011/158991
PCT Pub. Date: Dec. 22, 2011

(65) Prior Publication Data
US 2013/0075994 A1 Mar. 28, 2013

(30) Foreign Application Priority Data
Jun. 14, 2010 (KR) .......... 10-2010-0056027

(51) Int. Cl.
*B60G 7/04* (2006.01)
*F16C 11/06* (2006.01)

(52) U.S. Cl.
USPC ............ 280/124.134; 403/132; 403/135

(58) Field of Classification Search
USPC .......... 280/124.134; 267/141, 141.1, 141.2, 267/141.3, 141.4, 141.5, 141.7; 403/128, 403/130, 132, 134, 135; 277/549
See application file for complete search history.

(56) References Cited

U.S. PATENT DOCUMENTS 2,855,232 A * 10/1958 Kozak ............................ 403/132
3,977,740 A * 8/1976 Struttmann .................... 384/558
(Continued)

FOREIGN PATENT DOCUMENTS

GB 2400147 A 10/2004
JP 62-054321 A 3/1987
(Continued)

OTHER PUBLICATIONS

International Search Report & Written Opinion (Form PCT/ISA/210 & 237) for PCT/KR2010/04730, mailed Jul. 21, 2011.
(Continued)

*Primary Examiner* — Paul N Dickson
*Assistant Examiner* — Barry Gooden, Jr.
(74) *Attorney, Agent, or Firm* — Koppel, Patrick, Heybl & Philpott

(57) ABSTRACT

The present invention relates to a single-axis damping joint for connecting chassis components for a vehicle, and more particularly, to a single-axis damping joint for connecting chassis components for a vehicle, capable of improving performance of absorbing forward and backward vibration of a vehicle body and vibration due to distortion force while improving durability.
To this end, the present invention provides the single-axis damping joint for connecting chassis components for the vehicle, including: a ball stud including a spherical portion on an axis; bearings disposed so as to induce rotation of the ball stud in an axis direction; a sheet member configured to support an external circumferential surface of the bearing; a buffer member disposed at an external circumferential surface of the sheet member; and an outer pipe configured to protect the sheet member from the outside while being in close contact with the external circumferential surface of the sheet member and coupled to one end of a lower arm.

7 Claims, 4 Drawing Sheets

(56) References Cited

U.S. PATENT DOCUMENTS

| | | | |
|---|---|---|---|
| 4,034,996 A | | 7/1977 | Manita et al. |
| 4,447,094 A | * | 5/1984 | Trudeau et al. ............... 384/145 |
| 5,058,867 A | * | 10/1991 | Hadano et al. ............. 267/141.3 |
| 5,460,678 A | * | 10/1995 | Reinsma et al. .............. 156/242 |
| 5,931,597 A | * | 8/1999 | Urbach ........................ 403/134 |
| 6,082,721 A | * | 7/2000 | Kingsley ...................... 267/276 |
| 6,224,046 B1 | * | 5/2001 | Miyamoto .................... 267/281 |
| 6,776,552 B2 | * | 8/2004 | Marunaka ..................... 403/124 |
| 7,017,890 B2 | | 3/2006 | Rechtien |
| 7,438,493 B2 | * | 10/2008 | Holmes et al. ................ 403/134 |
| 7,658,546 B2 | * | 2/2010 | Clarke et al. .................. 384/192 |
| 8,141,841 B2 | * | 3/2012 | von Lillienskjold et al. . 248/677 |
| 2008/0012269 A1 | * | 1/2008 | Steinke ...................... 280/728.1 |
| 2008/0304902 A1 | * | 12/2008 | Buchner et al. ................. 403/76 |
| 2011/0033227 A1 | * | 2/2011 | Kwon ........................... 403/135 |

FOREIGN PATENT DOCUMENTS

| | | |
|---|---|---|
| JP | 05-026226 A | 2/1993 |
| JP | 05-147417 A | 6/1993 |
| JP | 06-280851 A | 10/1994 |
| KR | 10-2005-0038725 | 4/2005 |
| KR | 10-2009-0039335 | 4/2009 |

OTHER PUBLICATIONS

Extended European Search from European Patent Appl. No. 10853292.0-1755, dated Mar. 7, 2014.

* cited by examiner

SINGLE-AXIS DAMPING JOINT FOR CONNECTING CHASSIS COMPONENTS FOR VEHICLES

TECHNICAL FIELD

The present invention relates to a single-axis damping joint for connecting chassis components for a vehicle, and more particularly, to a single-axis damping joint for connecting chassis components for a vehicle, capable of improving performance of absorbing forward and backward vibration of a vehicle body and vibration due to torsional force while improving durability.

BACKGROUND

In general, a suspension system of a vehicle is referred to as a suspension and is an apparatus for connecting wheels to a vehicle body, and includes a spring for adjusting transmission of shock from a road surface to a vehicle body, a shock absorber for absorbing shock from the road surface together with the spring, an arm or a link for controlling an operation of the wheel, and a stabilizer for preventing rolling of a vehicle.

The suspension system of the vehicle, which is a significant apparatus for improving ride comfort and driving stability, primarily serves to suppress or rapidly reduce vibration provided from the wheels while stably supporting the vehicle body from the wheels.

A lower arm 1 performing a function of connecting the wheels to the vehicle body and supporting the wheels is used in the suspension system. As illustrated in FIG. 1, the lower arm 1 includes a vehicle body mounting bush 10 (also called "A bush"), a damping joint 20 (also called "G bush"), and a ball joint 30 at respective ends thereof, so that the wheels are mounted in the vehicle body.

Here, the vehicle body mounting bush 10 and the damping joint 20 are connected and coupled to a vehicle body frame 2 by assembling bolts 41 and 42, respectively, and the ball joint 30 is coupled with a knuckle of the wheel to support the wheels together with an upper arm.

In the meantime, as illustrated in FIG. 2, the damping joint 20 includes an interior pipe member 21 having a predetermined diameter, a buffer member 22 made of rubber and having both side center portions perforated by the interior pipe member 21 to be installed so as to surround an external circumferential surface of the interior pipe member 21, and an exterior pipe member 23 coupled while surrounding the external circumferential surface of the buffer member 22.

The damping joint 20 including the aforementioned configuration simultaneously prevents an impact harshness phenomenon that is single vibration generated followed by shock sound when tires of a driving vehicle pass through a projection of road surface, a shimmy phenomenon that is horizontal shakiness in a direction in which a steering wheel of a turning vehicle is rotated, and a judder phenomenon, in which noise or vibration is generated in the steering wheel or a dash panel when braking force is generated when the vehicle is driven at a high speed, among random excitation transmitted from the outside of the vehicle.

Further, the damping joint 20 supports all loads transmitted to the lower arm 1. In order to effectively support the load of the vehicle, a plurality of holes in a direction of the load is formed in the buffer member 22 included in the damping joint 20 or a separate reinforcing steel or a reinforcing member made of plastic or urethane is integrally inserted inside the buffer member 22.

However, if a plurality of reinforcing members is applied in order to support the load of the vehicle, general durability of the damping joint 20 deteriorates and the damping joint 20 is easily aged when the reinforcing member is made of rubber, thereby causing frequent damage.

CONTENTS OF THE INVENTION

Technical Object

The present invention has been made in an effort to provide a single-axis damping joint for connecting chassis components for a vehicle having advantages of capable of reducing costs while having the same performance with that of an existing ball joint.

Means for Achieving the Object

An exemplary embodiment of the present invention provides a single-axis damping joint for connecting chassis components for a vehicle, including: a ball stud including a spherical portion on an axis; bearings disposed so as to induce rotation of the ball stud in an axis direction; a sheet member configured to support an external circumferential surface of the bearing; a buffer member disposed at an external circumferential surface of the sheet member; and an outer pipe configured to protect the sheet member from the outside while being in close contact with the external circumferential surface of the sheet member and coupled to one end of a lower arm.

The bearing may be disposed so as to be in rolling-contact with an external circumferential surface of the spherical portion of the ball stud.

The bearing may be made of a synthetic resin material, and have a plurality of protrusions at an external circumferential surface of the bearing in a circumferential direction.

The bearing includes one pair of bearings to be separated from coupled to each other, and the pair of bearings may be fitted to both sides of the axis with the spherical portion interposed therebetween, and have a ring-shaped recess and a ring-shaped protrusion corresponding to each other at respective edge ends facing each other.

Ring-shaped sealing members configured to prevent foreign substances and water from passing through from the outside may be disposed at both ends of the bearing in the axis direction so as to compress an external circumferential surface of the ball stud.

The sealing member may be made of thermostatic polyurethane.

The sheet member may have a space spaced by a predetermined distance formed between the buffer member, the bearing, and the sealing member, and may be formed by filling the space with plastic by insert molding.

The outer pipe may be made of a metal material, and include a knurling portion at an internal circumferential surface.

The buffer member may be made of a rubber material.

Effect of the Invention

As described above, according to the single-axis damping joint for connecting chassis components for the vehicle according to the exemplary embodiment of the present invention, there is no constraint in the rotation direction about the hollow shaft, so that load is equally supported compared to a saddle stitched bush, thereby achieving advantages of simultaneously guaranteeing durability in the rotation direction and improving a resultant operation sense.

Further, there is an advantage in that foreign substances and water are prevented from passing through by the sealing members disposed at both ends of the bearing in the axis direction.

BEST MODE FOR EXECUTING THE INVENTION

Figure 1:
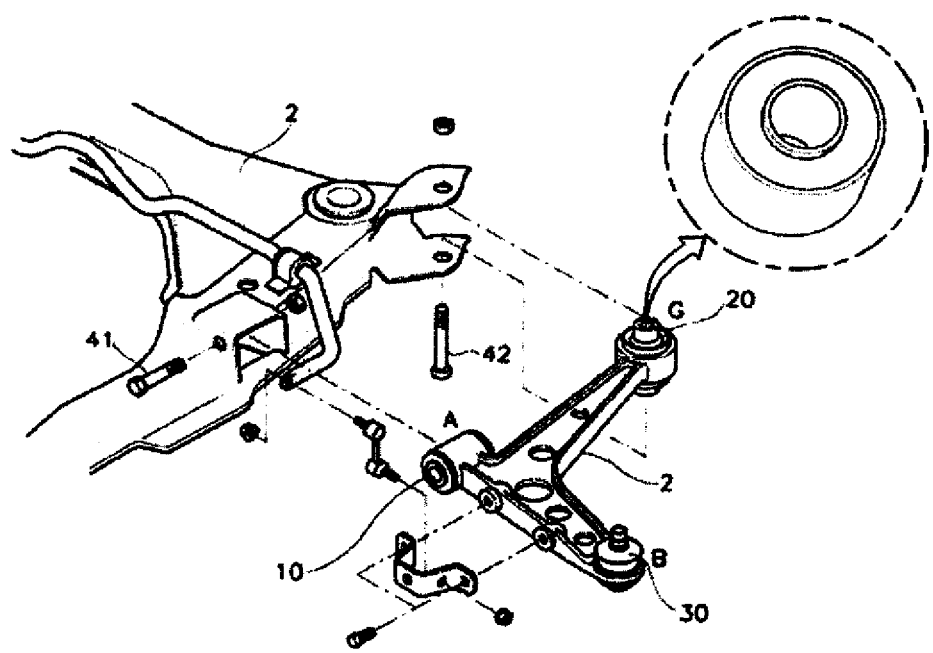
FIG. 1 illustrates a mounted state of a single-axis damping joint for connecting chassis components for a vehicle according to the related art.
Figure 2:
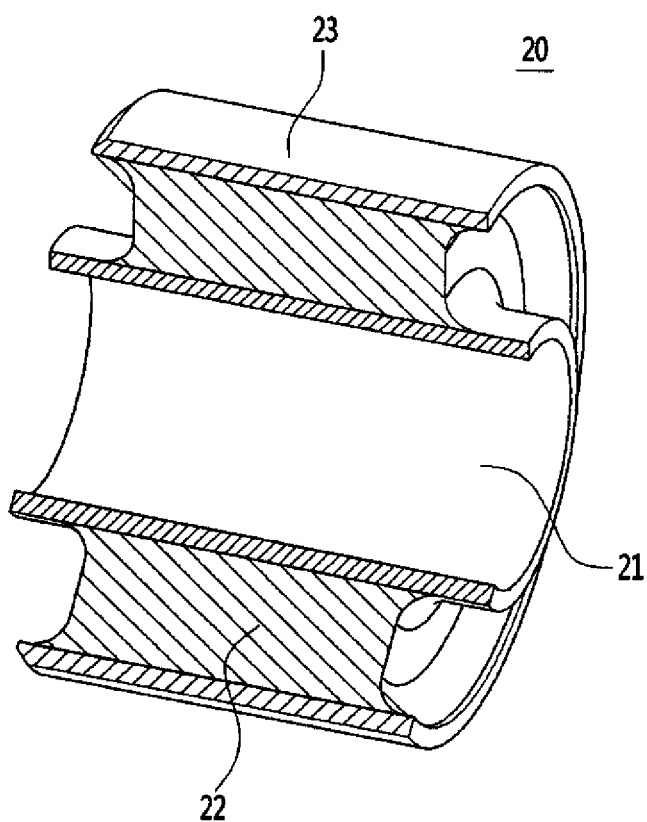
FIG. 2 is a cross-sectional perspective view of the damping joint according to the related art.

Hereinafter, an exemplary embodiment of the present invention will be described in detail with reference to the accompanying drawings.

A single-axis damping joint 100 for connecting chassis components for a vehicle according to an exemplary embodiment of the present invention is applied to a suspension for a vehicle for connecting a vehicle axis and a vehicle body to reduce vibration or shock which the vehicle axis receives from a road surface during driving, thereby improving ride comport.

The damping joint 100 is applied to various types of links, such as an upper arm, a lower arm, an assist arm, and a trail arm, for connecting chassis components for the vehicle.

The damping joint 100 according to the present exemplary embodiment includes a ball stud 110, bearings 120, a sheet member 130, a buffer member 140, and an outer pipe 150.

Figure 3:
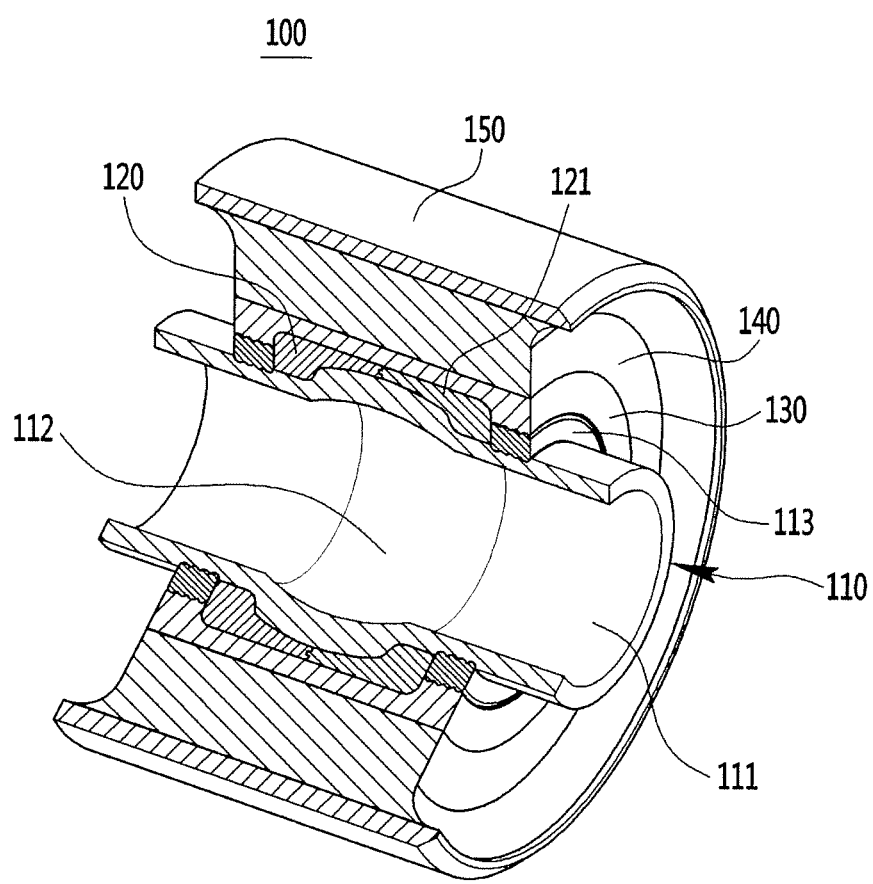
FIG. 3 is a cross-sectional perspective view of a single-axis damping joint for connecting chassis components for a vehicle according to an exemplary embodiment of the present invention.
Figure 4:
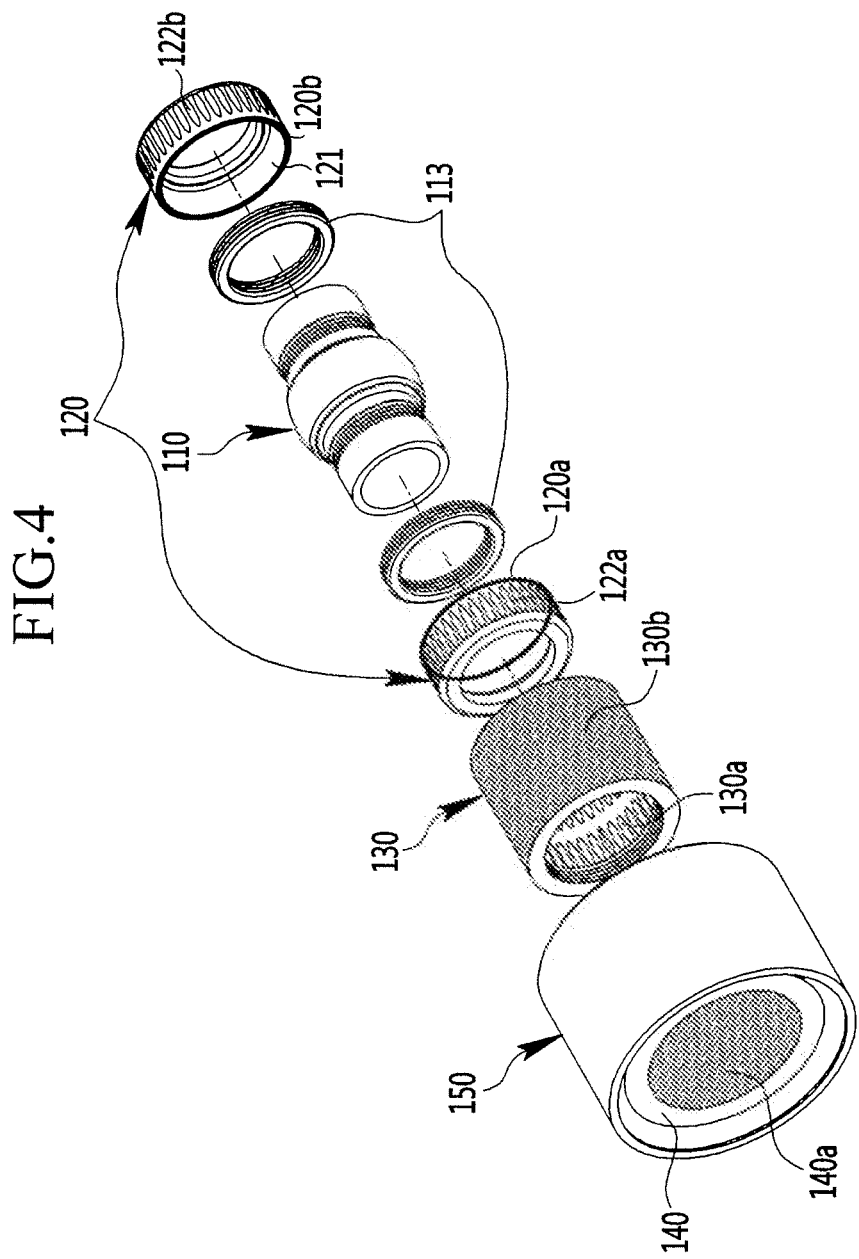
FIG. 4 is an exploded perspective view of a single-axis damping joint for connecting chassis components for a vehicle according to an exemplary embodiment of the present invention.

The ball stud 110 is a rotation shaft connected to the vehicle body through a mounting bolt (not illustrated), and includes a hollow shaft 111 having hollowness and a spherical portion 112 integrally formed on the hollow shaft 111 as illustrated in FIGS. 3 and 4.

Here, the spherical portion 112 has a spherically convex ball shape at a center portion of the hollow shaft 111, and assigns a characteristic of rotating in a circumferential direction of the hollow shaft 111 and a characteristic of moving in a vertical direction of the hollow shaft 111 to the hollow shaft 111.

The bearings 120 support rotation of the hollow shaft 111 in the circumferential direction and moving of the hollow shaft 111 in the vertical direction, and may make a pair so as to be easily separated from and coupled to each other, and is mounted to be in rolling-contact with an external circumferential surface of the spherical portion 112.

That is, the pair of bearings 120 is fitted to both ends of the hollow shaft 111 in the shaft direction with the spherical portion 112 of the ball stud 110 interposed therebetween, and is mounted to be in rolling-contact with the external circumferential surface of the spherical portion 112.

Here, each bearing 120 is made of a synthetic resin material, such as plastic, has both ring-shaped and opened ends, and has a spherical surface 121 rolling-contactable to the external circumferential surface of the spherical portion 112 on an interior surface thereof.

Further, each bearing 120 may include a plurality of protrusions 122a and 122b along a circumferential direction on an external circumferential surface thereof.

The protrusions 122a and 122b are formed to protrude with a predetermined length in a direction of a width of the bearing 120, so that friction force of a surface contacting a sheet member 130 to be described below is improved, thereby more firmly fixing the bearing 120 to the sheet member 130.

In this case, in the pair of bearings 120, facing edge ends rolling-contacting the external circumferential surface of the spherical portion 112 may be coupled to each other.

That is, the facing edge ends of each bearing 120 include a ring-shaped recess 120a and a ring-shaped protrusion 120b corresponding to the ring-shaped recess 120a, thereby additionally having a function of guiding the pair of bearings 120 so that the pair of bearings 120 is fitted to and adjusted with each other.

Accordingly, the pair of bearings 120 is fitted to both ends of the hollow shaft 111 in the shaft direction with the spherical portion 112 of the ball stud 110 interposed therebetween, and the ring-shaped protrusion is coupled to the ring-shaped recess at the facing edge end, so that the pair of bearings 120 is in rollable contact with the external circumferential surface of the spherical portion 112.

Further, sealing members 113 for preventing foreign substances and water from passing through from the outside are disposed at both ends of the bearing 120 in an axis direction. The sealing members 113 are formed in a ring shape, and are disposed so as to simultaneously compress both ends of the bearing 120 inwardly and compress an external circumferential surface of the ball stud 110.

Here, the sealing member 113 may be made of thermoplastic polyurethane (TPU) having oil resistance and wear resistance as a material having excellent elasticity.

As illustrated in FIG. 3, the sheet member 130 supports the external circumferential surface of the bearing 120, and is included as a sheet for sealing the bearing 120 so as to make the bearing 120 be in closer contact with the external circumferential surface of the spherical portion 112 of the ball stud 110.

The sheet member 130 is made of a synthetic resin material, and may be molded by insert molding between the buffer member 140 and the bearing 120 disposed in an internal circumferential surface of the outer pipe 150 to be described below.

The sheet member 130 serves to integrally support the outer pipe 150 and the bearing 120 between the buffer member 140 and the external circumferential surface of the bearing 120.

That is, the outer pipe 150 and the bearing 120 in the present exemplary embodiment are integrally formed through the sheet member 130.

Here, the sheet member 130 is mounted so that the bearing 120 is in rolling-contact with the spherical portion 112 of the ball stud 110, and is mold by insert molding a molding resin between the outer pipe 150 and the bearing 120 in a state where the outer pipe 150 is separately formed from the bearing 120 at the external circumferential surface of the bearing 120.

A molding process of the sheet member 130 is performed through an insert molding process through an injection mold in the publicly known art, and thus a more detailed description thereof will be omitted in the present specification.

In the meantime, since the sheet member 130 is molded by insert molding between the internal circumferential surface of the outer pipe 150 and the external circumferential surface of the bearing 120, a plurality of recesses 130a corresponding to the plurality of protrusions of the bearing 120 may be formed at the internal circumferential surface of the sheet member 130 as described above.

Accordingly, in the exemplary embodiment or the present invention, since the sheet member 130 is molded by insert molding between the outer pipe 150 and the bearing 120, the recesses 130a are formed at the internal circumferential surface of the sheet member 130 by the protrusions 122a and 122b of the bearing 120, so that the external circumferential surface of the bearing 120 may be more firmly engaged with the internal circumferential surface of the sheet member 130.

However, the exemplary embodiment of the present invention is not limited thereto, and it should be understood that as the sheet member 130 is molded between the outer pipe 150 and the bearing 120, the outer pipe 150 and the bearing 120 are integrally formed at the sheet member 130.

The buffer member is interposed between the bearing 120 and the outer pipe 150 to serve to reduce vibration and shock transmitted from a road surface.

That is, the buffer member 140 may be formed of rubber having excellent buffering performance, and is disposed so as to be mutually compressed between the outer pipe 150 and the bearing 120.

In this case, the buffer member 140 includes a knurling portion (not illustrated) knurling processed in a shape of the teeth of a comb at an internal circumferential surface thereof to be formed so as to correspond to the external circumferential surface of the sheet member 130.

As described above, the sheet member 130 is molded by insert molding by forming the knurling portion, so that engagement force between the internal circumferential surface of the buffer member 140 and the external circumferential surface of the sheet member 130 is improved.

Although the external circumferential surface of the sheet member 130 is not illustrated in the drawing, it is obvious that in the exemplary embodiment of the present invention, as the sheet member 130 is molded by insert molding between the internal circumferential surface of the buffer member 140 and the external circumferential surface of the bearing 120, a knurling portion having a shape corresponding to the knurling portion of the buffer member 140 is formed at the external circumferential surface of the sheet member 130.

The outer pipe 150 has a pipe shape of which both ends are opened, and may be formed of a steel material so that components embedded inside the outer pipe 150 may be protected from the outside.

As described above, the single-axis damping joint for connecting chassis components for the vehicle according to the exemplary embodiment of the present invention has a structure having no constraint in a rotation direction about the hollow shaft, so that durability in the rotation direction is completely guaranteed compared to a saddle stitched bush in the related art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A single-axis damping joint for connecting chassis components for a vehicle, comprising:
   a ball stud including a spherical portion on an axis;
   bearings disposed so as to induce rotation of the ball stud in an axis direction;
   a sheet member configured to support an external circumferential surface of the bearings;
   a buffer member disposed at an external circumferential surface of the sheet member;
   ring-shaped sealing members configured to prevent foreign substances and water from passing through from the environment outside of the damping joint disposed at both outer ends of the bearings in the axis direction so as to compress an external circumferential surface of the ball stud; and
   an outer pipe configured to protect the sheet member from the environment outside of the damping joint while being in close contact with the external circumferential surface of the sheet member and coupled to one end of a lower arm,
   wherein the sheet member has a space spaced by a predetermined distance formed between the buffer member, the bearings, and the sealing members, and is formed by filling the space with plastic by insert molding.

2. The single-axis damping joint of claim 1, wherein the sealing members are made of thermoplastic polyurethane.

3. The single-axis damping joint of claim 1, wherein the outer pipe is made of a metal material, and includes a knurling portion at an internal circumferential surface.

4. The single-axis damping joint of claim 1 wherein the buffer member is made of a rubber material.

5. The single-axis damping joint of claim 1, wherein each of the bearings is disposed so as to be in rolling-contact with an external circumferential surface of the spherical portion of the ball stud.

6. The single-axis damping joint of claim 5, wherein each of the bearings is made of a synthetic resin material, and has a plurality of protrusions at an external circumferential surface of the bearing in a circumferential direction.

7. The single-axis damping joint of claim 5, wherein the bearings comprise at least one pair of bearings separated from and coupled to each other, and the pair of bearings is fitted to both sides of a shaft with the spherical portion interposed therebetween, and has a ring-shaped recess and a ring-shaped protrusion corresponding to each other at respective edge ends facing each other.

* * * * *